(12) United States Patent
Meyer et al.

(10) Patent No.: US 8,075,862 B2
(45) Date of Patent: Dec. 13, 2011

(54) HYDROPHOBIC FUMED SILICA AND SILICONE RUBBER MATERIALS CONTAINING THE FUMED SILICA

(75) Inventors: Juergen Meyer, Stockstadt (DE); Horst Zeizinger, Hanau (DE); Mario Scholz, Gruendau (DE); Uwe Ellenbrand, Steinau (DE)

(73) Assignee: Evonik Degussa GmbH, Essen (DE)

( * ) Notice: Subject to any disclaimer, the term of this patent is extended or adjusted under 35 U.S.C. 154(b) by 93 days.

(21) Appl. No.: 12/601,408

(22) PCT Filed: May 6, 2008

(86) PCT No.: PCT/EP2008/055575
§ 371 (c)(1),
(2), (4) Date: Nov. 23, 2009

(87) PCT Pub. No.: WO2008/141931
PCT Pub. Date: Nov. 12, 2008

(65) Prior Publication Data
US 2010/0168305 A1    Jul. 1, 2010

(30) Foreign Application Priority Data
May 22, 2007   (DE) .................... 10 2007 024 095

(51) Int. Cl.
*C01B 33/12* (2006.01)
*B32B 5/16* (2006.01)
*C08K 3/34* (2006.01)

(52) U.S. Cl. .................. 423/335; 428/405; 524/492

(58) Field of Classification Search .................. None
See application file for complete search history.

(56) References Cited

U.S. PATENT DOCUMENTS

| | | | | |
|---|---|---|---|---|
| 3,929,718 A * | 12/1975 | Kratel et al. | ................... | 523/213 |
| 4,150,101 A * | 4/1979 | Schmidt et al. | ............... | 423/338 |
| 5,776,240 A * | 7/1998 | Deller et al. | ................... | 106/482 |
| 5,959,005 A * | 9/1999 | Hartmann et al. | ............. | 523/213 |
| 6,316,050 B1 | 11/2001 | Troll et al. | | |
| 6,752,864 B2 * | 6/2004 | Meyer et al. | ................... | 106/483 |
| 7,780,937 B2 * | 8/2010 | Meyer et al. | ................... | 423/335 |
| 2002/0077407 A1* | 6/2002 | Meyer et al. | ................... | 524/492 |
| 2002/0168524 A1* | 11/2002 | Kerner et al. | ................. | 428/405 |
| 2003/0181565 A1* | 9/2003 | Panz et al. | ...................... | 524/492 |
| 2004/0110077 A1 | 6/2004 | Yachi et al. | | |
| 2005/0171268 A1 | 8/2005 | Scholz et al. | | |
| 2005/0215668 A1 | 9/2005 | Scholz et al. | | |
| 2005/0241531 A1 | 11/2005 | Meyer et al. | | |
| 2005/0244642 A1 | 11/2005 | Meyer et al. | | |
| 2006/0017038 A1* | 1/2006 | Hasenzahl et al. | ................. | 252/2 |
| 2007/0191537 A1 | 8/2007 | Meyer et al. | | |
| 2009/0298982 A1* | 12/2009 | Meyer et al. | ................... | 524/268 |

FOREIGN PATENT DOCUMENTS

| | | |
|---|---|---|
| DE | 10 2004 005 155 | 8/2005 |
| DE | 10 2004 005 222 | 8/2005 |
| DE | 10 2004 010 756 | 9/2005 |
| EP | 0 076 377 | 4/1983 |
| EP | 0 637 616 | 2/1995 |
| EP | 1 406 129 | 4/2004 |
| EP | 1 736 505 | 12/2006 |
| EP | 1 801 073 | 6/2007 |
| EP | 1 801 166 | 6/2007 |
| WO | 2004 020532 | 3/2004 |
| WO | 2007 128636 | 11/2007 |

* cited by examiner

*Primary Examiner* — Robert Loewe
(74) *Attorney, Agent, or Firm* — Oblon, Spivak, McClelland, Maier & Neustadt, L.L.P.

(57) ABSTRACT

The present invention relates to a hydrophobic, fumed silica which is obtained by milling a fumed silica which has fixed dimethylsilyl and/or monomethylsilyl groups on the surface due to silanization; and to a process for the preparation of the silica according to the invention, and to silicone rubber materials containing the silica according to the invention.

17 Claims, No Drawings

HYDROPHOBIC FUMED SILICA AND SILICONE RUBBER MATERIALS CONTAINING THE FUMED SILICA

The invention relates to hydrophobic fumed silica, a process for its preparation, its use and silicone rubber materials containing the fumed silica.

Fumed silica is known from Ullmanns Enzyklopädie der technischen Chemie [Ullmann's Encyclopaedia of Industrial Chemistry], Volume 21, page 464 (1982). The fumed silica is prepared by combusting a vaporizable silicon compound, such as, for example, silicon tetrachloride, as a mixture with hydrogen and oxygen.

Silicone rubber materials and the use of fumed silica (AEROSIL®) in silicone rubber materials are known (Ullmann's Encyclopaedia of Industrial Chemistry, Volume A 23, Rubber, 1, 221 et seq.; Rubber 3, 3, 6 et seq.; Volume A 24, Silicones, 57 et seq. 1993).

Owing to their excellent thickening effect (thixotropic effect), fumed silicas are used in silicone sealing compounds, these being desired as joint sealer in the application. If, however, the silicone rubber materials are to be used as coating materials, little thickening is advantageous (U.S. Pat. No. 6,268,300). However, the optical quality of the surface of the silicone vulcanisates is of decisive importance in every case.

It is therefore an object of the present invention to provide a fumed silica having improved properties and silicone rubber materials which exhibit an optically high-quality surface as a result of the use of this fumed silica as an active filler after vulcanization.

The technical object is achieved by a hydrophobic, fumed silica which is obtained by milling a fumed silica which has fixed dimethylsilyl and/or monomethylsilyl groups on the surface due to silanization.

It is particularly preferred here if the silica according to the invention is a silica milled by means of an air-jet mill or pinned-disc mill. Silicas are obtained thereby which have a lower grindometer value than the unmilled starting material used, i.e. the unmilled silicas. Thus, the milled silica according to the invention is for example better and more rapidly dispersible in silicon rubber materials than is the starting product. Thus, the unmilled silica has a grindometer value of 50 μm while the grindometer value of the silica according to the invention is 20 μm. The silica according to the invention therefore has a grindometer value of, preferably, less than 20 μm or has a grindometer value reduced by more than 60% compared with the starting material.

It is further preferred if the silica has a tamped density of 10 to 80 g/l, particularly preferably of 10 to 60 g/l.

In further embodiments of the silica according to the invention, it has a BET specific surface area of 150 to 200 m$^2$/g, preferably of 160 to 180 m$^2$/g, particularly preferably of 165 to 175 m$^2$/g.

The silica according to the invention preferably has an average particle size according to Cilas of 3.0 to 20.0 μl.

In a further embodiment, the silica has a pH in the range from 4.0 to 5.0, preferably from 4.0 to 4.5, particularly preferably from 4.2 to 4.3.

In a further embodiment, the silica has a carbon content of 0.1 to 10.0, preferably of 0.5 to 3.0, particularly preferably of 0.5 to 1.5, % by weight.

The invention furthermore relates to a process for the preparation of the fumed silica according to the invention, characterized by the step of milling a fumed silica which has fixed dimethylsilyl and/or monomethylsilyl groups on the surface due to silanization. The silica used preferably has a BET surface area of 130 to 250 m$^2$/g, preferably of 150 to 190 m$^2$/g, and a tamped density of 30 to 100 g/l, preferably of 40 to 60 g/l, particularly preferably of approximately 50 g/l.

In a further preferred embodiment of the preparation process according to the present invention, the silicas used have the following physicochemical characteristics:

| | | |
|---|---|---|
| BET surface area[1] | m$^2$/g | 130 to 250, preferably 150 to 190 |
| Mean size of the primary particles | nm | 12 |
| pH[6)7)] | | 3.6-4.7 |
| C content | % by weight | 0.7-1.3 |
| Loss on drying[3] (2 h at 105° C.) on leaving the supplier | % by weight | <=0.5 |
| Loss on ignition[4)5)] (2 h at 1000° C.) | % by weight | <=2.0 |
| SiO$_2$ content[8] | % by weight | >=99.8 |
| Al$_2$O$_3$ content[8] | % by weight | <=0.050 |
| Fe$_2$O$_3$ content[8] | % by weight | <=0.010 |
| TiO$_2$ content[8] | % by weight | <=0.030 |
| HCl content[8] | % by weight | <=0.1 |

[1] According to DIN ISO 9277
[3] According to DIN EN ISO 787-2, ASTM D 280, JIS K 5101/23
[4] According to DIN EN 3262-20, ASTM D 1208, JIS K 5101/24
[5] Based on the substance dried for 2 hours at 105° C.
[6] According to DIN EN ISO 787-9, ASTM D 1208, JIS K 5101/26
[7] Water:methanol = 1:1
[8] Based on the substance ignited for 2 hours at 1000° C.
[9] HCl content in constituent of loss on ignition Fumed silicas are known from Winnacker-Küchler Chemische Technologie [Chemical Technology], Volume 3 (1983) 4th edition, page 77 and Ullmanns Enzyklopädie der technischen Chemie [Ullmann's Encyclopaedia of Industrial Chemistry], 4th edition (1982), Volume 21, page 462.

In particular, fumed silicas are prepared by flame hydrolysis of vaporizable silicon compounds, such as, for example, SiCl$_4$, or organic silicon compounds, such as trichloro-methylsilane, in the oxyhydrogen flame.

The silanized, fumed silicas used can be prepared by treating fumed silica in a known manner with dimethylchlorosilane and/or monomethyltrichlorosilane, the dimethylsilyl and/or monomethylsilyl groups being fixed on the surface of the fumed silica.

In a particular embodiment of the invention, the starting silica used can be a fumed silica hydrophobicized by means of dimethyldichlorosilane.

The milling of the silanized, fumed silica can be effected using a pinned-disk mill or an air-jet mill.

The silicas according to the invention are used as thickeners or thixotropic agents in silicone rubber materials.

The technical object is furthermore achieved by silicone rubber materials containing the hydrophobic fumed silica according to the invention obtained by milling a fumed silica which has fixed dimethylsilyl and/or monomethylsilyl groups on the surface due to silanization.

The grindometer value is lower as a result of this measure than in the presence of the corresponding unmilled silica. Thus, the grindometer value of the silica according to the invention is lower than that of the starting material and, with a dispersing time of 30 min, is less than 20 μm, while the grindometer value of the unmilled silica is 50 μm. It is therefore preferable if the grindometer value of the silica according to the invention is reduced by more than 60% compared with the value of the unmilled silica.

In a preferred embodiment, it is preferred if the tamped density of silica present in the silicone rubber material is 10 to 80 g/l, particularly preferably 10 to 60 g/l.

In a further preferred embodiment, the silicone rubber material contains 0.5 to 60% by weight, based on the total material, of said hydrophobic fumed silica which is obtained by milling a fumed silica which has fixed dimethylsilyl and/or monomethylsilyl groups on the surface due to silanization; and 40-99.5% by weight of an organopolysiloxane of the formula:

where R=alkyl, alkoxy, aryl, oxime, acetoxy or alkyl radicals having 1 to 50 carbon atoms, unsubstituted or substituted by O, S, F, Cl, Br or I, in each case identical or different, and/or polystyrene, polyvinyl acetate, polyacrylate, polymethacrylate and polyacrylonitrile radicals having 40-10 000 repeating units.

Z=OH, Cl, Br, acetoxy, amino, aminoxy, oxime, alkoxy, amido, alkenyloxy, acryloylxy or phosphate radicals, it being possible for the organic radicals to carry up to 20 carbon atoms, in each case identical or different.

Z'=oxime, alkoxy, acetoxy, amino or amido, n=1-3

X=100-15 000.

Organopolysiloxanes which may be used are all polysiloxanes which were used or could be used to date as bases for room temperature vulcanizing (RTV) materials. They can be described, for example, by the general formula:

where X, R, Z' and Z have the following meanings:
where R=alkyl, alkoxy, aryl, oxime, acetoxy or alkyl radicals having 1 to 50 carbon atoms, unsubstituted or substituted by O, S, F, Cl, Br or I, in each case identical or different, and/or polystyrene, polyvinyl acetate, polyacrylate, polymethacrylate and polyacrylonitrile radicals having 40-10 000 repeating units.

Z=OH, Cl, Br, acetoxy, amino, aminoxy, oxime, alkoxy, amido, alkenyloxy, acryloylxy or phosphate radicals, it being possible for the organic radicals to carry up to 20 carbon atoms, in each case identical or different.

Z'=oxime, alkoxy, acetoxy, amino or amido, n=1-3

X=100-15 000.

In the abovementioned formula, other siloxane units, generally present only as impurities, for example those of the formula $RSiO_{3/2}$, $R3O_{1/2}$ and $SiO_{4/2}$, where R in each case has the meaning mentioned above therefor, may also be present. The amount of these other siloxane units should not exceed 10 mol %.

Examples of R having the meaning alkyl radical are, for example, methyl, ethyl, propyl, hexyl and octyl radicals; alkenyl radicals which may be used are vinyl, allyl, ethylallyl and butadienyl radicals; and aryl radicals which may be used are phenyl and tolyl radicals.

Examples of substituted hydrocarbon radicals R are in particular halogenated hydrocarbon radicals, such as the 3,3,3-trifluoropropyl radical, chlorophenyl radical and bromotolyl radical; and cyanoalkyl radicals, such as the β-cyanoethyl radical.

Examples of polymers as radical R are polystyrene, polyvinyl acetate, polyacrylate, polymethacrylate and polyacrylonitrile radicals linked to silicon via carbon.

The predominant part of the radicals R consists of methyl groups, owing to the easier accessibility. The other radicals R are in particular vinyl and/or phenyl groups.

Particularly in the case of the presence of formulations storable in the absence of water and curing on admission of water at room temperature to give elastomers, Z and Z' are hydrolysable groups. Examples of such groups are acetoxy, amino, aminoxy, alkenyloxy (e.g. $H_2C=(CH_3CO)$), acyloxy and phosphate groups. Especially owing to the easy accessibility, acyloxy groups, in particular acetoxy groups, are preferred as Z. However, excellent results are also achieved, for example, with oxime groups, such as those of the formula —ON=C(CH$_3$)(C$_2$H$_5$), as Z. Examples of hydrolysable atoms Z are halogen and hydrogen atoms. Examples of alkenyl groups Z are in particular vinyl groups.

The viscosity of the organopolysiloxanes used in the invention should not exceed 500 000 cP at 25° C., preferably 150 000 cP at 25° C. Accordingly, the value x should preferably not exceed 40 000.

Examples of organopolysiloxanes which may be used are the silicone polymers E50 (α,ω-hydroxydimethylsilyloxypolydi-methylsiloxane) or M50 (α,ω-hydroxydimethylsilyloxypoly-dimethylsiloxane) from GE Bayer Silicones.

It is also possible to use mixtures of different organopolysiloxanes.

The mixing of these organopolysiloxanes with the silicas according to the invention and optionally the further constituents of the formulation according to the invention can be effected in any desired known manner, for example in mechanical mixing apparatuses. It takes place very rapidly and easily, regardless of the order in which the addition of the constituents of the mixture is carried out.

Preferably, the silicas used according to the invention are used in amounts of 0.5 to 60% by weight, preferably 3% to 30% by weight, based on the total weight of the materials curable to give elastomers.

If reactive terminal units having Si-bonded hydroxyl groups are present as the only such groups in the diorganopolysiloxanes containing reactive terminal units, these diorganopolysiloxanes must be crosslinked. This can be effected in a manner known per se by the water present in the air, optionally with addition of further water comprising a crosslinking agent. Here, it is possible to use, for example, the Silopren crosslinking agent 3034 from GE Bayer Silicones, the ethyltriacetoxysilane optionally in the presence of a condensation catalyst in a known manner. Suitable catalysts for all formulations according to the invention are, for example, the Silopren catalysts DBTA or type 162 dibutyltin diacetate or dilaurate from the same manufacturer.

In a particular variant of the silicone rubber materials according to the invention, 0.5-20, preferably 2-10, % by weight of a crosslinking agent having the formula

where
R'=alkyl, alkoxy, acetoxy, oxime, aryl or alkene radicals having 1 to 50 carbon atoms, unsubstituted or substituted by O, S, F, Cl, Br or I, in each case identical or different, and/or polystyrene, polyvinyl acetate, polyacrylate, polymethacrylate and polyacrylonitrile radicals having 5-5000 repeating units.

Z'=OH, Cl, Br, acetoxy, oxime, amino, aminoxy, alkenyloxy or phosphate radicals, it being possible for the organic radicals to carry up to 20 carbon atoms, in each case identical or different.

t=3 or 4, may additionally be present.

All weight data are based on the total amount of silicone rubber materials.

Examples of silanes of the abovementioned formulae are ethyl-triacetoxysilane, methyltriacetoxysilane, isopropyltriacetoxysilane, isopropoxytriacetoxysilane, vinyltriacetoxysilane, methyltrisdiethylaminooxysilane, methyltris (cyclohexylamino)silane, methyltris(diethylphosphato)silane and methyltris(methylethylketoximo)silane.

Of course, in addition to organopolysiloxanes, water-repellent silica, crosslinking agents and crosslinking catalysts, formulations according to the invention may optionally contain fillers conventionally used mostly or frequently in materials curable to give elastomers. Examples of such substances are fillers having a surface area of less than 50 m$^2$/g, such as quartz powder, kaolin, phyllosilicates, clay minerals, diatomaceous earth, furthermore zirconium silicate and calcium carbonate, and furthermore untreated fumed silica, organic resins, such as polyvinyl chloride powder, organopolysiloxane resins, fibrous fillers, such as asbestos, glass fibres and organic pigments, soluble dyes, fragrances, corrosion inhibitors, agents which retard curing, such as benzotriazole, and plasticizers, such as dimethyl-polysiloxanes endcapped by trimethylsilyloxy groups.

The RTV 1-component silicone rubber materials according to the invention can optionally contain 0.1-20, preferably 0.1-15, particularly preferably 0.1-10% by weight (based on the total amount of the formulation) of water-binding substances. Suitable substances for this purpose are, for example, carboxylic anhydrides, for example acetic anhydride or maleic anhydride, and/or carbonic acid esters, such as, for example, diethyl carbonate or ethyl carbonate and/or alkenyloxy compounds and/or ketals, such as, for example, dimethyldioxolane. It is also possible to use one or more of these substances.

Furthermore, the silicone rubber materials may contain 0.01 to 99.5% by weight of an unfunctionalized polysiloxane. The polysiloxanes already mentioned may be used here provided that they are not functionalized. A suitable, unfunctional polysiloxane is, for example, Baysilone oil M1000 (polydimethylsiloxane) from Ge Bayer Silicones.

In addition, the silicone rubber materials may contain 0.01 to 6% by weight of organic or inorganic compounds of the metals Pt, Sn, Ti and/or Zn as a catalyst and/or 0.01 to 6% by weight of inhibitors and/or 0.01-6% by weight of fungicides and/or bactericides and/or 0.01 to 6% by weight of adhesion promoters (such as, for example, Silopren adhesion promoter 3001 from GE Bayer Silicones, having the composition: di-tert-butoxydiacetoxysilane). Fungicides/bactericides which may be used are, for example, isothiazolinone, vinycin or benzisothiazolinone.

The silicone rubber materials according to the invention can be used as silicone rubber systems from the group consisting of the room temperature vulcanizing one-component silicone rubber sealing compounds (1C-RTV) and self-levelling room temperature vulcanizing silicone rubber materials (1C-RTV).

The silicone rubber materials can be used as jointing compounds, window sealing compounds, seals in motor vehicles, sports equipment and household appliances, heat-resistant seals, oil-exuding seals resistant to chemicals, and water vapour-resistant seals, and seals in electrical and electronic devices.

The silicone rubber materials can be used as coating materials for textiles, e.g. lace tape (antislip), and textile materials, e.g. woven glass fabric or woven nylon fabric.

The vulcanisates of the silicone rubber materials according to the invention advantageously have a high-quality surface.

The milled silica according to the invention has, in comparison with the starting material, specific surface areas which have remained constant and unchanged pH values but advantageously lower grindometer values of less than 20 μm. The starting material has a grindometer value of 50 μm. Surprisingly, the relatively low grindometer values are retained despite the compaction due to bagging or bagging/levelling and even after bagging/levelling/storage, evident from the tamped density (cf. Table 3). Silicone rubber materials which contain the silica according to the invention likewise have advantageous properties in comparison with those materials which contain only the starting material (silica before milling). With the use of the silicas, good surface properties of the silicone vulcanizates are surprisingly obtained in comparison with the starting material (Table 3, comparative example), although these silicas have higher tamped densities, which would usually lead to a poor surface character. The rheological properties remain uninfluenced thereby (cf. Table 4).

The present invention is explained with reference to the following examples which, however, do not limit the scope of protection.

EXAMPLES

1. Milling

For the preparation of the examples according to the invention, commercially available AEROSIL® R974 (bagged product) was metered by means of a metering balance into the mill used and was milled.

AEROSIL® R974 is a fumed silica hydrophobicized with DDS (dimethyldichlorosilane), based on hydrophilic fumed silica AEROSIL having a specific surface area of 200 m$^2$/g.

The physicochemical characteristics of the AEROSIL® R974 are shown in Table 1.

TABLE 1

| Fumed silica used | | |
|---|---|---|
| | | AEROSIL ® R 974 |
| Behaviour with respect to water | | hydrophobic |
| Appearance | | white powder |
| BET surface area[1] | m$^2$/g | 150-190 |
| Mean primary particle size | nm | 12 |
| Tamped density[2] | g/l | about 50 |
| Loss on drying[3] (2 h at 105° C.) on leaving the supplier | % by weight | <=0.5 |
| Loss on ignition[4,5] (2 h at 1000° C.) | % by weight | <=2.0 |
| C content | % by weight | 1.0-2.0 |
| pH[6,7] | | ≧4.0 |
| SiO$_2$ content[8] | % by weight | >=99.8 |
| Al$_2$O$_3$ content[8] | % by weight | <=0.05 |
| Fe$_2$O$_3$ content[8] | % by weight | <=0.01 |
| TiO$_2$ content[8] | % by weight | <=0.03 |
| HCl content[8,9] | % by weight | <=0.025 |

[1] According to DIN ISO 9277
[2] According to DIN EN ISO 787-11, JIS K 5101/20 (unsieved)
[3] According to DIN EN ISO 787-2, ASTM D 280, JIS K 5101/23
[4] According to DIN EN 3262-20, ASTM D 1208, JIS K 5101/24
[5] Based on the substance dried for 2 hours at 105° C.
[6] According to DIN EN ISO 787-9, ASTM D 1208, JIS K 5101/26
[7] Water:methanol = 1:1
[8] Based on the substance dried for 2 hours at 105° C.
[9] HCl content in constituent of loss on ignition For the preparation of the examples according to the invention, commercially available AEROSIL® R 974 (bagged product) was metered by means of a metering balance into the mill used and was milled. A pinned-disk mill (Alpine 160Z, rotor diameter 160 mm) or an air-jet mill (grinding chamber diameter: 240 mm, grinding chamber height: 35 mm) was used for the experiments. The milled product was isolated using bag filter (filter area: 3.6 m$^2$, filter material: woven nylon fabric). In further experiments, the milled product obtained was packed by means of a commercially available bagging machine into commercially available bags. In further experiments, the bags packed with milled product were leveled by a technically customary method suitable for this purpose prior to palletization. For storage, the samples packed in bags and leveled were stored for 35 days as lowermost layer of a pallet consisting of 9 layers prior to the tests. The parameters of the preparation process are shown in Table 2.

TABLE 2

The table shows the parameters of the preparation of some examples of the silicas according to the invention

| Example | Mill* | MA** quantity [m³] | MA** pressure [bar] | IA*** quantity [m³] | IA*** pressure [bar] | Dose [kg/h] | Bagging | Levelling | Storage |
|---|---|---|---|---|---|---|---|---|---|
| 1 | AJ | 27.5 | 3.5 | 15.9 | 3.7 | 10 | No | No | No |
| 2 | AJ | 27.5 | 3.5 | 15.9 | 3.7 | 10 | Yes | No | No |
| 3 | AJ | 27.5 | 3.5 | 15.9 | 3.7 | 10 | Yes | Yes | No |
| 4 | AJ | 27.5 | 3.5 | 15.9 | 3.7 | 10 | Yes | Yes | Yes |
| 5 | AJ | 11.5 | 1.0 | 6.8 | 1.2 | 10 | No | No | No |
| 6 | AJ | 11.5 | 1.0 | 6.8 | 1.2 | 10 | Yes | No | No |
| 7 | AJ | 11.5 | 1.0 | 6.8 | 1.2 | 10 | Yes | Yes | Nein |
| 8 | AJ | 11.5 | 1.0 | 6.8 | 1.2 | 10 | Yes | Yes | Yes |
| 9 | PD | — | — | — | — | 10 | No | No | No |
| 10 | PD | — | — | — | — | 10 | Yes | No | No |
| 11 | PD | — | — | — | — | 10 | Yes | Yes | No |
| 12 | PD | — | — | — | — | 10 | Yes | Yes | Yes |
| 13 | PD | — | — | — | — | 20 | No | No | No |
| 14 | PD | — | — | — | — | 20 | Yes | No | No |
| 15 | PD | — | — | — | — | 20 | Yes | Yes | No |
| 16 | PD | — | — | — | — | 20 | Yes | Yes | Yes |

*AJ = air jet mill, PD = pinned-disk mill,
MA** = milling air,
IA*** = injector air

2. Determination of the Physicochemical Characteristics of the Milled Silicas

2.1 BET Surface Area

The BET surface area is determined according to DIN ISO 9277.

2.2. Tamped Density

The determination of the tamped density is affected according to DIN EN ISO 787-11.

Principles of the tamped density determination:

The tamped density (formerly tamped volume) is equal to the quotient of the mass and the volume of a powder after tamping in a tamped density determination apparatus under specified conditions. According to DIN ISO 787/XI, the tamped density is stated in $g/cm^3$. Owing to the very low tamped density of the oxides, however, we state the value in g/l. Furthermore, the drying and sieving and the repetition of the tamping process are dispensed with.

Apparatuses for tamped density determination:

Tamped density determination apparatus

Measuring cylinder

Laboratory balance (accuracy of reading 0.01 g)

Tamped density determination procedure:

200±10 ml of oxide are introduced into the measuring cylinder of the tamped density determination apparatus so that no cavities remain and the surface is horizontal. The mass of the sample introduced is determined accurately to 0.01 g. The measuring cylinder with the sample is inserted into the measuring cylinderhalter container of the tamped density determination apparatus and tamped 1250 times. The volume of the tamped oxide is read to an accuracy of 1 ml.

Evaluation of the tamped density determination:

$$\text{Tamped density}(g/l) = \frac{g\ \text{sample weight} \times 1000}{ml\ \text{volume read}}$$

2.3 Determination of the pH

Reagents for the pH determination:

distilled or demineralized water, pH>5.5

Methanol, p.a.

Buffer solutions pH 7.00, pH 4.66

Apparatuses for the pH determination:

Laboratory balance (accuracy of reading 0.1 g)

Beaker, 250 ml

Magnetic stirrer

Magnetic rod, length 4 cm combined pH electrode pH meter

Dispensette, 100 ml

Working method for determination of the pH:

The determination is effected on the basis of DIN EN ISO 787-9.

Calibration: before the pH measurement, the meter is calibrated with the buffer solutions. If a plurality of measurements is carried out in succession, a single calibration is sufficient.

4 g of oxide are converted into a paste with 48 g (61 ml) of methanol in a 250 ml beaker, and the suspension is diluted with 48 g (48 ml) of water and stirred for five minutes with a magnetic stirrer (speed about 1000 $min^{-1}$), with the pH electrode immersed.

After the stirrer has been switched off, the pH is read after a standing time of one minute. The result is reported to one decimal place.

2.4 Grindometer Value

Basic principles:

The degree of dispersing determines the performance characteristics of the liquid thickened with silica according to the invention. The measurement of the grindometer value serves for assessing the degree of dispersing. The grindometer value is understood as meaning the limiting layer thickness below which the specks or aggregates present on the surface of the spread sample are visible. The sample is spread by means of a doctor blade in a channel whose depth at one end is twice as large as the diameter of the largest Aerosil particles and decreases continuously to 0 towards the other end. On a scale indicating the depth of the channel, that value of the depth in microns below which a relatively large number of Aerosil particles are visible by specks or scratches on the surface of the binder system is read off. The value read off is the grindometer value of the system present.

Apparatuses and reagents:
Hegmann grindometer having a depth range of 100-0 microns.

Preparation of the Dispersion (Aerosil in Bekanol):
96 g of Bekanol and 4 g of Aerosil are weighed into a plastic beaker and mixed with a spatula by hand. The mixture is dispersed for 5 min using a dissolver at 5000 min$^{-1}$ (dispersing disc about 1 mm away from the bottom of the plastic beaker). The plastic beaker should be closed with a cover through which a hole has been drilled, in order to prevent the mixture from spraying out.

After the dispersing, the sample is evacuated briefly for removing enclosed air bubbles. The dispersion remains standing in the covered beaker for 45 min.

Procedure:
The grindometer block is placed on a level, nonslip surface and wiped clean immediately before the test. The Aerosil dispersion, which must be free of air bubbles, is then mounted at the lowest point of the channel so that it flows away somewhat over the edge of the channel. The doctor blade is now held with both hands and placed perpendicularly to the grindometer block and at right angles to its longitudinal edges with slight pressure on the end of the channel in which the dispersion is present. The dispersion is then spread by slow, uniform drawing of the doctor blade over the block in the channel. At the latest, 3 seconds after the spreading of the dispersion, the grindometer value is read.

The surface of the spread dispersion (transversely to the channel) is viewed obliquely from above at an angle of 20-30° (to the surface). The block is held to the light so that the surface structure of the spread dispersion is readily recognizable. The value in microns below which a relatively large number of Aerosil particles are visible as specks or scratches on the surface is read on the scale as the grindometer value. Individual, randomly occurring specks or scratches are not taken into account. The graininess is assessed at least twice, in particular in each case for a newly spread dispersion.

Evaluation:
The arithmetic mean value is calculated from the measured values. The following relationship exists between the grindometer value in microns and the Hegmann units based on the inch system and FSPT units:

B=8−0.079 A
C=10−0.098 A=1.25 B

Here, the meanings are as follows:
A=grindometer value in microns
B=grindometer value in Hegmann units
C=grindometer value in FSPT units Table 3 summarizes the physicochemical data of the silicas according to the invention, such as specific surface area, pH, tamped density, grindometer value and average particle size according to Cilas.

TABLE 3

Physicochemical data of the silicas according to the invention

| Example | BET surface area [m$^2$/g] | pH | Tamped density [g/l] | Grindometer value [μm] | D50 value [μm] Cilas |
|---|---|---|---|---|---|
| Comparative Example | 170 | 4.3 | 49 | 50 | 52.5 |
| Example 1 | 168 | 4.3 | 14 | <20 | 3.6 |
| Example 2 | 168 | 4.3 | 36 | <20 | n.d. |
| Example 3 | 168 | 4.2 | 45 | <20 | n.d. |
| Example 4 | 166 | 4.3 | 52 | <20 | 16 |
| Example 5 | 170 | 4.3 | 19 | <20 | 8.8 |
| Example 6 | 168 | 4.3 | 35 | <20 | n.d. |
| Example 7 | 170 | 4.3 | 32 | <20 | n.d. |
| Example 8 | 169 | 4.3 | 55 | <20 | 13.6 |
| Example 9 | 167 | 4.3 | 20 | <20 | 8.9 |
| Example 10 | 169 | 4.3 | 32 | <20 | n.d. |
| Example 11 | 170 | 4.3 | 41 | <20 | n.d. |
| Example 12 | 169 | 4.3 | 49 | <20 | 6.2 |
| Example 13 | 167 | 4.3 | 25 | <20 | 6.3 |
| Example 14 | 170 | 4.3 | 54 | <20 | n.d. |
| Example 15 | 170 | 4.3 | 43 | <20 | n.d. |
| Example 16 | 170 | 4.3 | 53 | <20 | 12.7 |

The data of the milled products show at virtually constant specific surface areas and unchanged pH relatively low grindometer values of less than 20 μm compared with the starting material which has a grindometer value of 50 μm. Surprisingly, the relatively low grindometer values are retained despite the compaction, evident from the tamped density, as a result of bagging or bagging/levelling and even after bagging/leveling/storage.

3. Testing of Performance Characteristics 3.1 General Implementation of Tests
In order to test the performance characteristics of the silica according to the invention in RTV-1 silicone sealing materials, corresponding silicone materials are prepared on the laboratory scale according to a standard formulation. For this purpose, a planetary dissolver which must correspond to the following requirements is used: the stirring vessel holds about 2 litres and is provided with a double jacket with cooling water connection. Planetary drive and dissolver drive are independent. A vacuum pump must be present. An additional drum press facilitates the filling. Dismantling for cleaning should be rapid.

For the preparation of the silicone rubber materials, the following formulation is used by way of example:
62.4% of silicone polymer
Silopren E 50 (GE Bayer Silicones)
24.6% of silicone oil
Silicone Oil M 1000 (GE Bayer Silicones)
4.0% of acetate crosslinking agent
Crosslinking agent AC 3034 (GE Bayer Silicones)
1.0% of adhesion promoter
Adhesion promoter AC 3001 (GE Bayer Silicones)
0.01% of dibutyltin diacetate catalyst
8.0% of fumed silica
AEROSIL® (Degussa AG)

Procedure:
468.0 g of silicone polymer, 184.5 g of silicone oil, 30.0 g of crosslinking agent, and 7.5 g of adhesion promoter are weighed into a stirred vessel and homogenized for 1 minute at a speed of 50 rpm of the planetary drive and 500 rpm of the dissolver. Thereafter, 60 g of silica are incorporated at the same speed in 2 stages (about 30 g each) and the time which is required for wetting is determined.

As soon as the silica has been completely wetted, a vacuum of about 200 mbar is applied and dispersing is effected for 5 minutes at 100 rpm of the planetary stirrer and 2000 rpm of the dissolver drive. The sealing material is filled into two aluminium tubes using a drum press. The silicone rubber material thus obtained is spread using a knife coater and vulcanizes at room temperature in room air in the course of 24 h. The surface of the vulcanisates is assessed optically and rated according to a school marking system:

Marks: 1=very good, 2=good, 3=satisfactory, 4=unsatisfactory, 5=poor

The mark 1 is given if the vulcanisate has no defects or undispersed particles at all. Very few defects are visible in the case of mark 2, and slightly more in the case of the mark 3. In the case of the mark 4, so many defects are visible that the surface appearance would no longer be acceptable for technical use. The same applies to a greater extent for the mark 5.

Table 4 summarizes the observed properties of the silicone rubber materials containing the silica according to the invention. With the use of the silicas from Examples 8 and 16, good surface properties of the silicone vulcanisates are surprisingly obtained in comparison with the Comparative Example (starting material: unmilled silica), although these silicas have relatively high tamped densities, which would usually lead to a poor surface quality. The rheological properties remain uninfluenced here.

TABLE 4

Properties of the silicone sealing materials

| Product | Milling Bagging Levelling Storage | Flow limit [Pa] | Viscosity D = 10 s − 1 [Pa * s] | Dispersion [Marks] | Surface [Marks] |
|---|---|---|---|---|---|
| Comparative Example | Reference | 312 | 118 | 1.5 | 3 |
| Example 8 | AJ Yes Yes Yes | 302 | 117 | 1.5 | 2 |
| Example 16 | PD Yes Yes Yes | 323 | 119 | 1.5 | 2 |

Marks: 1 = very good, 2 = good, 3 = satisfactory, 4 = unsatisfactory, 5 = poor

The invention claimed is:

1. A hydrophobic fumed silica obtained by milling a fumed silica with a pinned-disk mill or an air-jet mill, which has fixed thereon at least one of dimethylsilyl and monomethylsilyl groups on a surface due to silanization,
wherein said hydrophobic fumed silica has
a grindometer value which is reduced by more than 60% compared with said fumed silica
a tamped density of 10 to 80 g/l,
a BET specific surface area of 150 to 200 m$^2$/g,
an average particle size according to Cilas of 3.0 to 20.0 μm,
a pH in the range from 4.0 to 5.0, and
a carbon content of 0.1 to 10% by weight.

2. A process for preparing the hydrophobic fumed silica according to claim 1, comprising milling a fumed silica which has fixed thereon at least one of dimethylsilyl and monomethylsilyl groups on a surface due to silanization.

3. The process according to claim 2, wherein said fumed silica has a BET surface area of 130 to 250 m$^2$/g and a tamped density of 30 to 100 g/l.

4. The process according to claim 3, wherein said fumed silica has a BET surface area of 150 to 190 m$^2$/g.

5. The process according to claim 3, wherein said fumed silica has a tamped density of 40 to 60 g/l.

6. The process according to claim 3, wherein said fumed silica has a tamped density of approximately 50 g/l.

7. A method of thickening a silicone rubber material comprising incorporating the hydrophobic fumed silica according to claim 1 into a silicone rubber material.

8. A silicone rubber material comprising the hydrophobic fumed silica of claim 1.

9. The silicone rubber material according to claim 8, wherein the material comprises 0.5 to 60% by weight, based on the total mass, of said hydrophobic fumed silica and 40-99.5% by mass of an organopolysiloxane of formula $$Z_n Si R_{3-n}\text{—O—}[Si R_2 O]_x\text{—}Si R_{3-n}\text{—}Z'_n$$

where R=alkyl, alkoxy, aryl, oxime, acetoxy or alkyl radical having 1 to 50 carbon atoms, unsubstituted or substituted by O, S, F, Cl, Br or I, in each case identical or different, and/or polystyrene, polyvinyl acetate, polyacrylate, polymethacrylate and polyacrylonitrile radicals having 40-10 000 repeating units Z=OH, Cl, Br, acetoxy, amino, aminoxy, oxime, alkoxy, amido, alkenyloxy, acryloyloxy or phosphate radicals, wherein organic radicals contained thereon carry up to 20 carbon atoms, in each case identical or different Z'=oxime, alkoxy, acetoxy, amino or amido, n=1-3

X=100-15 000.

10. The silicone rubber material according to claim 8, wherein the material comprises 0.5 to 60% by weight, of said hydrophobic fumed silica.

11. The silicone rubber material according to claim 8, wherein said material comprises 3 to 30% by weight, of said hydrophobic fumed silica.

12. The hydrophobic fumed silica according to claim 1, wherein said hydrophobic fumed silica has a tamped density of 10 to 60 g/l.

13. The hydrophobic fumed silica according to claim 1, wherein said hydrophobic fumed silica has a BET specific surface area of 160 to 180 m$^2$/g.

14. The hydrophobic fumed silica according to claim 1, wherein said hydrophobic fumed silica has a BET specific surface area of 165 to 175 m$^2$/g.

15. The hydrophobic fumed silica according to claim 1, wherein said hydrophobic fumed silica has a pH of from 4.0 to 4.5.

16. The hydrophobic fumed silica according to claim 1, wherein said hydrophobic fumed silica has a pH of from 4.2 to 4.3.

17. The hydrophobic fumed silica according to claim 1, wherein said hydrophobic fumed silica has a carbon content of 0.5 to 1.5% by weight.

* * * * *

UNITED STATES PATENT AND TRADEMARK OFFICE
CERTIFICATE OF CORRECTION

PATENT NO. : 8,075,862 B2  Page 1 of 1
APPLICATION NO. : 12/601408
DATED : December 13, 2011
INVENTOR(S) : Juergen Meyer et al.

It is certified that error appears in the above-identified patent and that said Letters Patent is hereby corrected as shown below:

On the title page, Item (87), the PCT Pub. Date is incorrect. Item (87) should read:

-- (87) PCT Pub. No.: WO/2008/141931
PCT Pub. Date: Nov. 27, 2008 --

Signed and Sealed this
Twenty-eighth Day of August, 2012

David J. Kappos
*Director of the United States Patent and Trademark Office*